United States Patent
Yoon et al.

(10) Patent No.: US 10,194,300 B2
(45) Date of Patent: Jan. 29, 2019

(54) USER TERMINAL APPARATUS, ELECTRONIC APPARATUS, SYSTEM AND CONTROLLING METHOD THEREOF

(71) Applicant: SAMSUNG ELECTRONICS CO., LTD., Suwon-si (KR)

(72) Inventors: Seung-il Yoon, Yongin-si (KR); Jee-hoon Ka, Suwon-si (KR); Sang-jin Kim, Suwon-si (KR); Dae-hyun Nam, Anyang-si (KR); Kyung-hoon Lee, Seoul (KR); Kyung-hee Jung, Suwon-si (KR); Hyun-kyu Yun, Seoul (KR); Byung-jo Jun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/854,415

(22) Filed: Dec. 26, 2017

(65) Prior Publication Data
US 2018/0124555 A1 May 3, 2018

Related U.S. Application Data

(63) Continuation of application No. 14/853,042, filed on Sep. 14, 2015, now Pat. No. 9,888,339.

(30) Foreign Application Priority Data

Oct. 31, 2014 (KR) ........................ 10-2014-0149899

(51) Int. Cl.
*H04W 4/00* (2018.01)
*H04W 4/80* (2018.01)
*H04W 76/14* (2018.01)

(52) U.S. Cl.
CPC ............. *H04W 4/80* (2018.02); *H04W 76/14* (2018.02)

(58) Field of Classification Search
CPC ... H04W 76/02; H04W 76/00; H04W 76/025; H04W 76/043; H04W 4/008; H04W 4/80; H04W 76/14
See application file for complete search history.

(56) References Cited

U.S. PATENT DOCUMENTS

| 8,787,575 B2 | 7/2014 | Laaksonen et al. |
| 9,106,337 B2 | 8/2015 | Jung et al. |

(Continued)

FOREIGN PATENT DOCUMENTS

| CN | 101098166 A | 1/2008 |
| CN | 103136928 A | 6/2013 |

(Continued)

OTHER PUBLICATIONS

Communication dated Mar. 26, 2018, issued by the European Patent Office in counterpart European Patent Application No. 15184267.1.

(Continued)

*Primary Examiner* — Ahmed Elallam
(74) *Attorney, Agent, or Firm* — Sughrue Mion, PLLC

(57) ABSTRACT

A user terminal apparatus and an electronic apparatus are provided. The user terminal apparatus including a first communicator configured to perform wireless communication with an external apparatus; a second communicator configured to perform bilateral wireless communication with the external apparatus; a storage configured to store information about a connection with an access point; and a controller configured to control the first communicator to transmit a control signal to the external apparatus, to initiate a pairing operation with the external apparatus, and in response to performing the pairing, to control the second (Continued)

communicator to transmit the information about the connection with the access point to the external apparatus.

23 Claims, 13 Drawing Sheets

(56) References Cited

U.S. PATENT DOCUMENTS

| | | | |
|---|---|---|---|
| 9,112,872 B2 | 8/2015 | Kirke | |
| 9,396,469 B1 | 7/2016 | Takayama et al. | |
| 9,888,339 B2 * | 2/2018 | Yoon | H04W 4/008 |
| 2007/0286113 A1 | 12/2007 | Kirke | |
| 2009/0154434 A1 | 6/2009 | Tanaka et al. | |
| 2012/0092144 A1 | 4/2012 | Kim | |
| 2013/0129358 A1 | 5/2013 | Jung et al. | |
| 2013/0252547 A1 | 9/2013 | Cho et al. | |
| 2014/0037104 A1 | 2/2014 | Seo et al. | |
| 2014/0055251 A1 | 2/2014 | Son et al. | |
| 2014/0119234 A1 | 5/2014 | Kwon | |
| 2014/0153557 A1 | 6/2014 | Kim | |
| 2014/0313420 A1 | 10/2014 | Kim et al. | |
| 2015/0009862 A1 | 1/2015 | Zhang et al. | |

FOREIGN PATENT DOCUMENTS

| | | |
|---|---|---|
| CN | 103781151 A | 5/2014 |
| JP | 2009239573 A | 10/2009 |
| KR | 10-2012-0038116 A | 4/2012 |
| KR | 1020130107968 A | 10/2013 |
| KR | 1020140018701 A | 2/2014 |
| KR | 10-2014-0029609 A | 3/2014 |
| KR | 10-2014-0103579 A | 8/2014 |

OTHER PUBLICATIONS

Communication dated Feb. 27, 2015, issued by the Korean Intellectual Property Office in counterpart Korean Application No. 10-2014-0149899.
Communication dated Mar. 10, 2016 issued by European Patent Office in counterpart European Patent Application No. 15184267.1.
Communication dated Nov. 28, 2016 issued by European Patent Office in counterpart European Patent Application No. 15184267.1.
Communication dated Oct. 10, 2017 issued by the State Intellectual Property of P.R. China in counterpart Application No. 201510600136.0.
Communication dated Oct. 26, 2015, issued by the Korean Intellectual Property Office in counterpart Korean Application No. 10-2014-0149899.
Communication dated Jul. 28, 2017, issued by the European Patent Office in counterpart European Patent Application No. 15184267.1.
International Search Report dated Feb. 18, 2016 issued by International Searching Authority in counterpart International Patent Application No. PCT/KR2015/011593.
Salminen et al., "Enhancing Bluetooth Connectivity with RFID", Pervasive Computing and Communications, Mar. 13, 2006, 6 pages total, IEEE, Piscataway, NJ, XP010910638.
Woodings et al., "Rapid Heterogeneous Ad Hoc Connection Establishment: Accelerating Bluetooth Inquiry Using IrDA", Wireless Communications and Networking Conference, Mar. 17, 2002, 11 pages total, IEEE, XP 010585789.
Written Opinion dated Feb. 18, 2016 issued by International Searching Authority in counterpart International Patent Application No. PCT/KR2015/011593.
Office Action issued in parent U.S. Appl. No. 14/853,042 dated Mar. 29, 2017.
Notice of Allowance issued in parent U.S. Appl. No. 14/853,042 dated Sep. 26, 2017.
Communication dated Aug. 2, 2018, issued by the State Intellectual Property Office of P.R. China in counterpart Chinese Application No. 201510600136.0.

* cited by examiner

USER TERMINAL APPARATUS, ELECTRONIC APPARATUS, SYSTEM AND CONTROLLING METHOD THEREOF

CROSS-REFERENCE TO RELATED APPLICATION(S)

This is a continuation application of U.S. application Ser. No. 14/853,042 filed on Sep. 14, 2015, which claims priority from Korean Patent Application No. 10-2014-0149899 filed on Oct. 31, 2014 in the Korean Intellectual Property Office, the disclosures of which are incorporated herein by reference.

BACKGROUND

1. Field

Methods and apparatuses consistent with exemplary embodiments relate to a user terminal apparatus, electronic apparatus, system and controlling method thereof, and more particularly, to a user terminal apparatus configured to provide and receive information on state of connection with an access point, and an electronic apparatus, system and method thereof.

2. Description of the Related Art

With the enhancement of electronic technologies, various types of electronic apparatuses are being developed. For example, apparatuses having wireless local area network (LAN) functions are coming into wide use as wireless LANs are being revitalized. An apparatus with a wireless LAN function may be connected to a network through an AP (Access Point). To connect the apparatus to a network, it is necessary to select an AP and perform a procedure of setting a connection with the AP.

However, it may be difficult for a user to input AP information and connect to an AP, which can be a problem. For example, APs often require lengthy passwords which may or may not be encrypted. Also, in areas such as large residential buildings, offices, and the like, a plurality of APs may exist, but it may be unclear which AP a user should connect with.

For example, in order to connect to an AP, AP information such as a service set identifier (SSID) or a network key must be input. However, because a home gateway or set top box is not provided with a display, it is difficult to provide a user interface (UI) for inputting such AP information. Furthermore, even in cases of televisions (TVs) that have displays, it may still be difficult to enter AP information because the TV may not have input means for inputting the AP information. For example, in the case of a TV, there is difficulty in displaying a virtual keyboard on a screen, and a user using direction keys of a remote controller to move a cursor on the virtual keyboard in order to input the AP information. Furthermore, the user typically has to manipulate each and every apparatus to connect it to an AP.

Accordingly, it is difficult to connect a conventional apparatus to an AP, which is a problem. Therefore, there is a need for a method that can more easily connect a plurality of apparatuses to an AP.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a user terminal apparatus that is capable of providing and receiving information about a connection with an access point based on unilateral wireless communication and bilateral wireless communication, and connecting to the access point, and an electronic apparatus, system and controlling method thereof.

According to an aspect of an exemplary embodiment, there is provided a user terminal apparatus including a first communicator configured to perform unilateral wireless communication with an external apparatus; a second communicator configured to perform bilateral wireless communication with the external apparatus; a storage configured to store information about a connection with an access point; and a controller configured to control the first communicator to transmit a control signal to the external apparatus, to initiate a pairing operation with the external apparatus, and in response to the pairing being completed, to control the second communicator to transmit the information about the connection to the external apparatus.

The control signal may include a turn on command for turning on the external apparatus.

The apparatus may further include a display configured to display a list of the information about the connection with the access point stored in the storage, and the controller may transmit information about the connection selected from the list to the external apparatus through the communicator.

The apparatus may further include a third communicator configured to perform bilateral wireless communication with the access point.

The first communicator may transmit the control signal in a form of an infrared (IR) signal to the external apparatus, the second communicator may perform the bilateral wireless communication with the external apparatus in a Bluetooth or Wi-Fi Direct method; and the third communicator may perform the bilateral wireless communication with the access point in the Wi-Fi Direct method.

In response to the pairing being completed, the controller may receive information about a state of connection with the access point from the external apparatus, and determine whether to transmit the information about the connection to the external apparatus based on the received information about the state of connection with the access point.

According to an aspect of another exemplary embodiment, there is provided an electronic apparatus including a receiver configured to receive a unilateral control signal from an external apparatus; a first communicator configured to perform bilateral wireless communication with the external apparatus; a second communicator configured to perform bilateral wireless communication with an access point; and a controller configured to, in response to receiving the unilateral control signal, perform pairing with the external apparatus, and in response to the pairing being completed, receive the information about a connection with the access point through the first communicator, and control the second communicator to connect to the access point and begin a communication session based on the received information about the connection.

The control signal may include a turn on command for turning on the external apparatus.

The receiver may receive the control signal in a form of an infrared (IR) signal from the external apparatus, the first communicator may perform the bilateral wireless communication with the external apparatus in a Bluetooth or Wi-Fi Direct method; and the second communicator may perform the bilateral wireless communication with the access point in the Wi-Fi Direct method.

The information about the connection may include a service set identifier (SSID) and key information for connecting to the access point.

According to an aspect of another exemplary embodiment, there is provided a system including an electronic apparatus; and a user terminal apparatus configured to control an operation of the electronic apparatus, wherein the user terminal apparatus is configured to transmit a unilateral control signal to the electronic apparatus, the electronic apparatus, in response to receiving the unilateral control signal, is configured to perform pairing with the user terminal apparatus, the user terminal apparatus, in response to the pairing being performed, is configured to perform bilateral wireless communication with the electronic apparatus and transmit information about a connection with an access point to which the user terminal apparatus is connected, and the electronic apparatus, in response to receiving the information about the connection, is configured to perform bilateral wireless communication with the access point using the information about the connection.

According to an aspect of another exemplary embodiment, there is provided a method for controlling a user terminal apparatus that includes a first communicator configured to perform unilateral wireless communication with an external apparatus and a second communicator configured to perform bilateral wireless communication with the external apparatus, the method including transmitting a control signal to the external apparatus through the first communicator; initiating a pairing operation with the external apparatus; and in response to the pairing operation being completed, transmitting prestored information about a connection with an access point to the external apparatus using the second communicator.

The control signal may include a turn on command for turning on the external apparatus.

The method may further include displaying a list of the prestored information about the connection with the access point, and the transmitting the information about the connection may include transmitting information about the connection selected from the list to the external apparatus through the second communicator.

The method may further include performing bilateral wireless communication with the access point.

The transmitting the control signal may include transmitting the control signal in a form of an infrared (IR) signal to the external apparatus, the transmitting the information about the connection may perform bilateral wireless communication with the external apparatus in a Bluetooth or Wi-Fi Direct method, and the performing the bilateral wireless communication with the access point may include performing the bilateral wireless communication with the access point in the Wi-Fi direct method.

The method may further include, in response to the pairing being completed, receiving the information about a state of connection with the access point from the external apparatus; and determining whether or not to transmit the information about the connection to the external apparatus based on the received information about the state of connection with the access point.

According to an aspect of another exemplary embodiment, there is provided a method for controlling an electronic apparatus that includes a first communicator configured to perform bilateral wireless communication with an external apparatus and a second communicator configured to perform bilateral wireless communication with an access point, the method including receiving a unilateral control signal from the external apparatus; in response to receiving the unilateral control signal, performing pairing with the external apparatus; in response to the pairing being completed, receiving information about a connection with the access point through the first communicator; and controlling the second communicator to connect to the access point and begin a communication session based on the received information about the connection.

The control signal may include a turn on command for turning on the external apparatus.

The receiving the control signal may include receiving the control signal in a form of an infrared (IR) signal from the external apparatus, the receiving the information about the connection may include performing bilateral wireless communication with the external apparatus in a Bluetooth or Wi-Fi Direct method, and the controlling the second communicator may include performing bilateral wireless communication with the access point in the Wi-Fi Direct method.

According to the various aforementioned embodiments, an electronic apparatus is capable of receiving information about a connection with an access point from a user terminal apparatus, and may easily connect to the access point based on the received information about the connection with the access point. For example, even without a short distance wireless communication reader, inputter, or display, and so forth, the electronic apparatus is capable of easily connecting with the access point.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
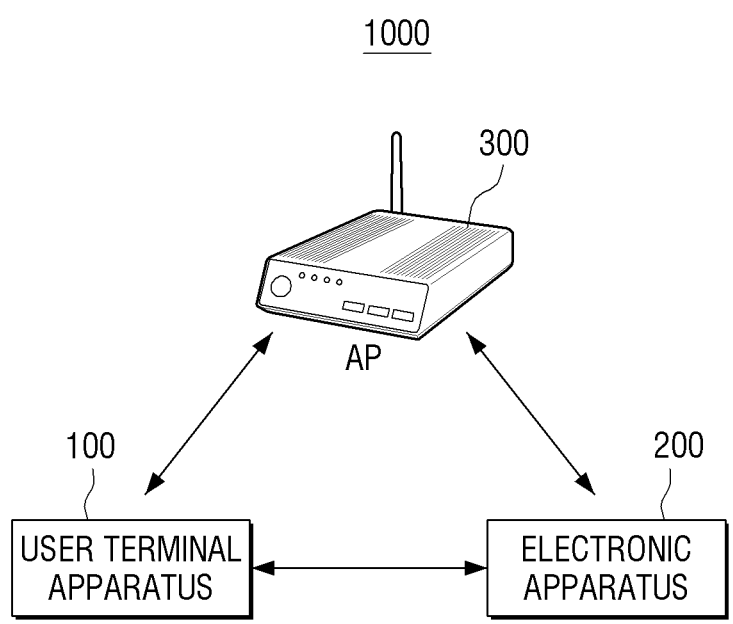
FIG. 1 is a diagram of a wireless communication system of a plurality of apparatuses according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist the reader in a comprehensive understanding of the exemplary embodiments. However, one or more exemplary embodiments may be practiced without those specifically defined matters. Also, well-known functions and constructions are not described in detail because they would obscure the application with unnecessary detail.

Also, in the method examples described and illustrated by the present disclosure, the progression of processing steps and/or operations described are for purposes of example; however, the sequence of and/or operations are not limited to that set forth herein and may be changed as is known in the art, with the exception of steps and/or operations necessarily occurring in a certain order.

FIG. 1 is a diagram illustrating a wireless communication system of a plurality of apparatuses according to an embodiment of the present disclosure.

Referring to FIG. 1, system 1000 includes a user terminal apparatus 100, an electronic apparatus 200, and an access point (AP) 300. According to various exemplary embodiments, the user terminal apparatus 100 may transmit a control signal to the electronic apparatus 200, and based on the control signal, the user terminal apparatus 100 and electronic apparatus 200 may initiate a communication connection therebetween. An operation of establishing the communication connection between the user terminal apparatus 100 and the electronic apparatus 200 may also be referred to as a pairing operation.

When pairing is completed between the user terminal apparatus 100 and electronic apparatus 200, the user terminal apparatus 100 may transmit to the electronic apparatus 200 information about a connection with the access point 300, and the electronic apparatus 200 may begin a communication session with the access point 300 based on the received information about the connection with the access point 300.

Accordingly, in the example illustrated in FIG. 1, the user terminal apparatus 100 and the electronic apparatus 200 each becomes capable of performing wireless communication with the access point 300.

That is, when pairing between the user terminal apparatus 100 and electronic apparatus 200 is finished and a communication connection is initiated therebetween, the user terminal apparatus 100 transmits information about a connection with the access point 300 to the electronic apparatus 200. In response, the electronic apparatus 200 becomes capable of performing a communication connection with the access point 300 based on the received information about connection with the access point 300, thereby enabling an easy connection of the electronic apparatus 200 to the access point.

Accordingly, it is possible to save a user the trouble of having to set both the user terminal apparatus 100 and electronic apparatus 200 individually to perform a communication connection with the access point.

Hereinafter, examples of each of the user terminal apparatus 100 and the electronic apparatus 200 and each process of connecting the user terminal apparatus 100 and electronic apparatus 200 with the access point 300 are described.

Figure 2:
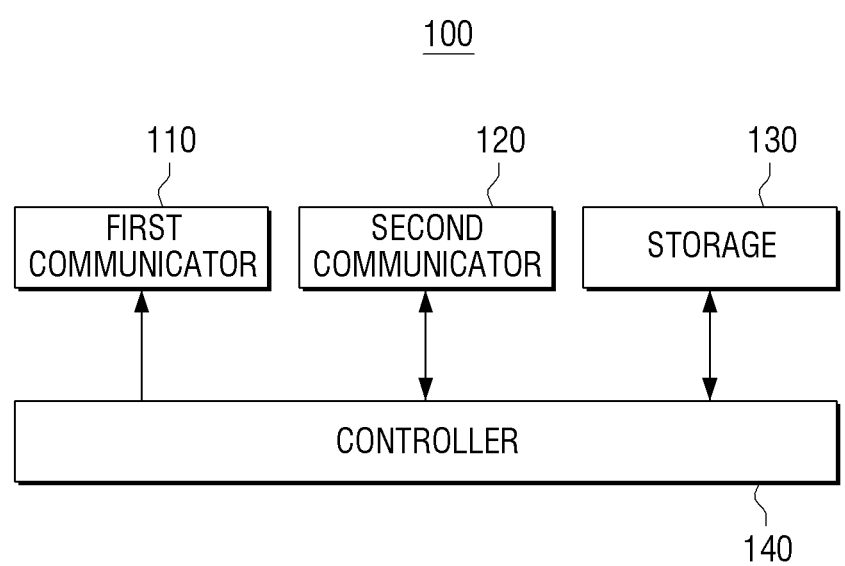
FIG. 2 is a block diagram illustrating a user terminal apparatus according to an exemplary embodiment.

FIG. 2 is a block diagram illustrating a user terminal apparatus according to an exemplary embodiment.

Referring to FIG. 2, the user terminal apparatus 100 includes a first communicator 110, a second communicator 120, a storage 130, and a controller 140. As a non-limiting example, the user terminal apparatus 100 may be embodied as a TV, a smart phone, a tablet, a desk top PC, a notebook, a remote control, an appliance, a sensor, a kiosk, and the like.

The first communicator 110 performs unilateral wireless communication with an external apparatus. For example, the unilateral wireless communication may be a communication using an infrared (IR) signal, a radio frequency (RF) signal, and the like. Furthermore, the unilateral wireless communication may also include a short distance wireless communication method such as Near Field Communication (NFC) and the like.

In an example in which the first communicator 110 is embodied as an IR sensor, and an IR receiver is provided in the external apparatus, the first communicator 110 may transmit an IR signal to the external apparatus to control the external apparatus.

Such an IR signal may easily obtain a broad bandwidth in comparison to a radio wave, however, the communication distance may be short and a transmitting side for transmitting the IR signal and receiving side for receiving the IR signal should be approximately facing each other. However, a user terminal apparatus 100 according to an exemplary embodiment may specify the external apparatus to be controlled using the aforementioned transmitting side and receiving side that face each other, and thus, there is an effect of selecting the external apparatus to be connected to the access point.

The second communicator 120 performs bilateral wireless communication with the external apparatus. For example, the second communicator 120 may perform bilateral wireless communication with the external apparatus selected to perform unilateral wireless communication with the first communicator 110.

Herein, bilateral wireless communication refers to a response type communication system where a transmitting side and receiving side may exchange information between each other unlike in unilateral wireless communication in which information only goes from one side to another. As an example, the second communicator 120 may perform bilateral communication with the external apparatus using various communication methods such as wireless LAN, WAN, Ethernet, Bluetooth, Zigbee, IEEE 1394, Wi-Fi, and the like.

Although the first communicator 110 and the second communicator 120 are described and shown as separate components, a single communicator may be utilized instead to perform both unilateral wireless communication and bilateral wireless communication.

The storage 130 may store information about a connection with the access point. Herein, the access point may refer to an apparatus that allows wireless apparatuses to be connected to a wired apparatus or other wireless apparatus using related standards such as Wi-Fi, Bluetooth, and the like, in a computer network.

According to various exemplary embodiments, the information about a connection with the access point may include information about an SSID, key information for connecting to the access point, and the like.

The SSID is an identifier that may be added to each header of packets that are transmitted through wireless communication. For example, the SSID may be text data that apparatuses using wireless communication use when accessing a basic set service (BSS), and that differentiates one wireless LAN from other wireless LANs. Accordingly, any apparatus that wants to access a certain wireless LAN must use the SSID that corresponds to that wireless LAN, and when the SSID changes, the apparatus trying to access the BSS with the old SSID cannot.

Furthermore, the key information may include information about a connection code for accessing the access point. For example, the connection code may include a password, for example, a Wired Equivalent Privacy (WEP) password, a Wi-Fi Protected Access (WPA) password, a Wi-Fi Protected Access II (WPA2) password, a WPA-Personal (WPA-PSK) password, and the like. As an example, the connection code may include an encrypted connection code.

The controller 140 may transmit a control signal to the external apparatus through the first communicator and initiate a pairing operation with the external apparatus. When the pairing is completed, the controller 140 may use the second communicator to transmit the information about a connection to the external apparatus.

For example, the controller 140 may control the first communicator 110 and transmit a control signal to the external apparatus to be connected for communication with the access point 300. For example, when the first communicator 110 is implemented as an IR sensor, the user may direct the IR sensor to the external apparatus to be connected for communication with the access point 300, and may transmit the control signal implemented as an IR signal to the external apparatus.

That is, the external apparatus that received the control signal from the user terminal apparatus 100 is an apparatus that is selected for execution of connection for communication with the access point.

The controller 140 may initiate a pairing operation with the external apparatus that received the control signal. When the pairing is completed, the controller 140 may become capable of performing bilateral wireless communication with the external apparatus through the second communicator 120. As the second communicator 120 may perform wireless communication using various communication methods, the controller 140 may perform bilateral wireless communication through various communication methods such as wireless LAN, WAN, Ethernet, Bluetooth, Zigbee, IEEE 1394, Wi-Fi, and the like.

Hereinafter, an example is provided in which a Bluetooth connection method between the user terminal apparatus 100 and external apparatus is performed when the second communicator 120 performs bilateral wireless communication through the Bluetooth communication method.

For example, the Bluetooth connection method is possible based on an assumption that the user terminal apparatus 100 and external apparatus both provide the Bluetooth communication method. For example, when connecting a smart phone with a TV that also provides the Bluetooth method, the smart phone may become a master apparatus and the TV may become a slave.

Furthermore, when the Bluetooth function of the smart phone is activated with the TV turned on, a search may be performed for all Bluetooth apparatuses near the smart phone. When the TV is selected from among the searched Bluetooth apparatuses, an immediate connection, that is, a pairing may be performed.

In some cases, codes may be input depending on the type of the apparatus providing the Bluetooth method. For example, the code may consist of letters, numbers, or other symbols provided to the slave apparatus. Once connected, from then on, a connection may be made automatically every time a power of each apparatus and Bluetooth are activated.

As another example, a second communicator 120 of a user terminal apparatus 100 may be connected with any apparatus providing Bluetooth according to the aforementioned Bluetooth connection method. Also, in response to the Bluetooth function being activated, the second communicator 120 may search for all Bluetooth apparatuses that are near the user terminal apparatus 100, and it may also perform pairing with an external apparatus that received the control signal through the first communicator 110 and automatically execute the Bluetooth connection.

Herein, the second communicator 120 may perform bilateral wireless communication through the Bluetooth communication method, but the second communicator is not limited thereto. For example, the second communicator 120 may perform the pairing using any one of various other wireless communication methods.

Furthermore, when the pairing with the external apparatus is completed, the controller 140 may transmit information about a connection with the access point 300 to the external apparatus using the second communicator 120.

For example, when the second communicator 120 of the user terminal apparatus 100 is connected to the external apparatus using the Bluetooth method as aforementioned, the controller 140 may transmit the information about the connection with the access point to the external apparatus using the Bluetooth connection through the second communicator 120.

The external apparatus that receives the control signal from the aforementioned user terminal apparatus 100 refers to an electronic apparatus 200 in the wireless communication system of FIG. 1. An example of the electronic apparatus 200 is further explained hereinafter.

Figure 3:
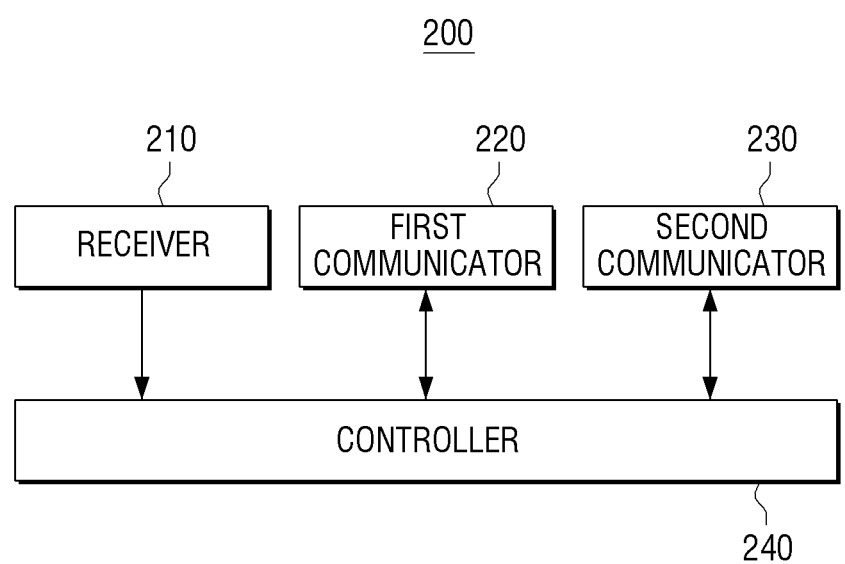
FIG. 3 is a block diagram illustrating an electronic apparatus according to an exemplary embodiment.

FIG. 3 is a block diagram illustrating an electronic apparatus according to an exemplary embodiment.

Referring to FIG. 3, the electronic apparatus 300 includes a receiver 210, first communicator 220, second communicator 230 and controller 240. As a non-limiting example, the electronic apparatus 300 may be implemented as one of various types of apparatuses such as a TV, electronic blackboard, electronic table, Large Format Display (LFD), smart phone, tablet, desktop PC, notebook, and the like, which may use and are capable of wireless communication.

The receiver 210 may receive a unilateral control signal from an external apparatus. The external apparatus may refer to the user terminal apparatus 100 in the wireless communication system of FIG. 1.

As an example, the receiver 210 may receive a unilateral control signal implemented as an IR signal or an RF signal from the external apparatus, and, in response to receiving a unilateral control signal implemented as an IR signal, the receiver 210 may be implemented as an IR receiver, and in response to receiving a unilateral control signal implemented as an RF signal, the receiver 210 may be implemented as a short distance wireless communication reader.

Furthermore, the first communicator 220 may perform bilateral wireless communication with the external apparatus. As aforementioned, the bilateral wireless communication refers to a transmit and receive type communication system in which a transmitting side and receiving side may exchange information between each other. In this case, the first communicator 220 may perform bilateral communication with the external apparatus, for example, using one of various communication methods such as wireless LAN, WAN, Ethernet, Bluetooth, Zigbee, IEEE 1394, and Wi-Fi.

The second communicator 230 may perform bilateral wireless communication with an access point.

The controller 240 may perform pairing with an external apparatus in response to receiving the unilateral control signal from the external apparatus. When the pairing is completed, the controller 240 may receive information about a connection with the access point from the external apparatus through the first communicator 220.

It should be appreciated that the first communicator 220 may perform wireless communication using various communication methods, but hereinafter, for convenience examples are described in which the first communicator 220 performs bilateral wireless communication in the Bluetooth communication method.

In an example in which the user terminal apparatus 100 is a smart phone that provides Bluetooth, and the electronic apparatus 200 is a TV that provides Bluetooth, the smart phone may become a master apparatus and the TV may become a slave. In this example, if the Bluetooth function of the smart phone is activated, a search may be made for all Bluetooth apparatuses near the smart phone. If the TV is turned on, the TV will be found as an apparatus capable of providing Bluetooth to the smart phone.

Furthermore, when the searched TV is selected by the smart phone, the smart phone and the TV may be immediately connected, that is, pairing may be performed therebetween in response to the TV being selected by the smart phone.

The first communicator 220 of an electronic apparatus 200 may be connected with the terminal apparatus 100 through Bluetooth. For example, the first communicator 220 may not only be searched for by the user terminal apparatus 100 and perform pairing, but, in response to a unilateral control signal being received from the user terminal apparatus 100, the first communicator 220 may perform pairing by automatic Bluetooth connection with the user terminal apparatus 100 that transmitted the unilateral control signal.

The first communicator 220 may perform bilateral wireless communication through the Bluetooth communication method, but there is no limitation thereto. Accordingly, it should also be appreciated that the first communicator 220 may perform pairing using various wireless communication methods.

Furthermore, when the pairing is completed, the controller 240 receives information about a connection with an access point through the first communicator 220. Accordingly, when the first communicator 220 and user terminal apparatus 100 are connected using the Bluetooth method, the controller 240 may receive the information about a connection with the access point in the Bluetooth method through the first communicator 220.

The controller 240 may control the second communicator 230 to connect to the access point and a communication session may begin based on the received information about connection with the access point. For example, when the information about a connection with the access point is received as the pairing is completed, the controller 240 may automatically connect to the access point and the communication session with the access point may begin based on the received information about a connection with the access point.

The control signal that the controller 140 of the user terminal apparatus 100 transmits to the external apparatus may include a turn on command for turning on the external apparatus. Accordingly, when the external apparatus is the electronic apparatus 200, the controller 140 of the user terminal apparatus 100 may transmit a control signal including the turn on command to the electronic apparatus 200 and initiate a pairing operation with the electronic apparatus 200. In this example, if the electronic apparatus 200 is in an off state, the turn on command can cause the electronic apparatus to turn itself on.

That is, if the electronic apparatus 200 is turned off, the controller 140 of the user terminal apparatus 100 may transmit a control signal including a control command for turning on the electronic apparatus 200. In this example, the electronic apparatus 200 that receives the control signal from the user terminal apparatus 100 may be turned on, and automatically perform pairing with the user terminal apparatus 100 that transmitted the control signal.

When the pairing is completed, the electronic apparatus 200 may receive the information about a connection with the access point from the user terminal apparatus 100, and may automatically connect to the access point and the communication session may begin based on the received information about the connection with the access point.

According to one or more exemplary embodiments, as described in some of the examples herein, the electronic apparatus 200 may receive information about a connection with an access point from another device. In response, the electronic apparatus 200 may automatically connect to the access point. In other words, the electronic apparatus 200 does not need to receive a user input or other selection for selecting the access point, nor does the electronic apparatus 200 need to receive a user input or other selection for connecting with the access point.

As another example, with the electronic apparatus 200 turned off, the user terminal apparatus 100 may transmit the control command for turning on the electronic apparatus 200 and perform pairing. Accordingly, it becomes possible to support the electronic apparatus 200 to easily connect with the access point and the communication session may begin by transmitting the information about the connection with the access point.

The user terminal apparatus 100 may further include a display (not illustrated) which may display a list of information about a connection with an access point stored in the storage.

Furthermore, the controller 140 may transmit the information about the connection with the access point selected from the list to the external apparatus through the second communicator, an example of which is described with reference to FIG. 4.

Figure 4:
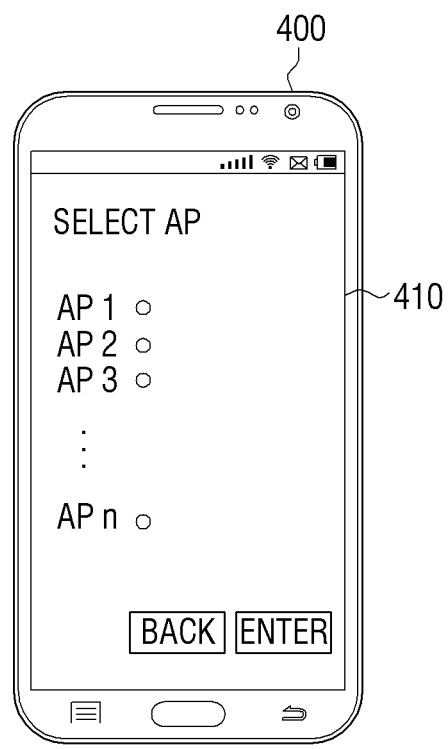
FIG. 4 is a view illustrating a screen of a user terminal apparatus for selecting information about a connection with an access point according to an exemplary embodiment.

FIG. 4 is a diagram illustrating a screen of a user terminal apparatus for selecting information about a connection with an access point according to an exemplary embodiment.

Referring to FIG. 4, a smart phone 400 is illustrated as an example of the user terminal apparatus 100. In this example, a screen is displayed on a display 410 of the smart phone 400, the screen showing a list of information about a connection with an access point. In this example, the list of information includes information about connections with a plurality of respective access points.

Once pairing with the electronic apparatus 200 is completed, the controller 140 of the user terminal apparatus 100 may control the display 410 to display the list of the information about a connection with the access point stored in the storage 130. Furthermore, when a user selects at least one connection with an access point from the list, the controller 140 may control the second communicator 120 to transmit the selected information about the connection with the access point to the electronic apparatus 200.

In this example, the controller 140 of the user terminal apparatus 100 controls the display 410 to display the list of information about a connection with access points that are stored in the storage. As another example, the controller 140 may control the display 410 to also display the list of the information about a connection with the access point that is newly connected before or after the pairing with the electronic apparatus 200 is initiated.

The controller 140 of the user terminal apparatus 100 may store the information about a connection with the access point that is newly connected in the storage 130 and update the information about the connection with the access point.

Figure 5:
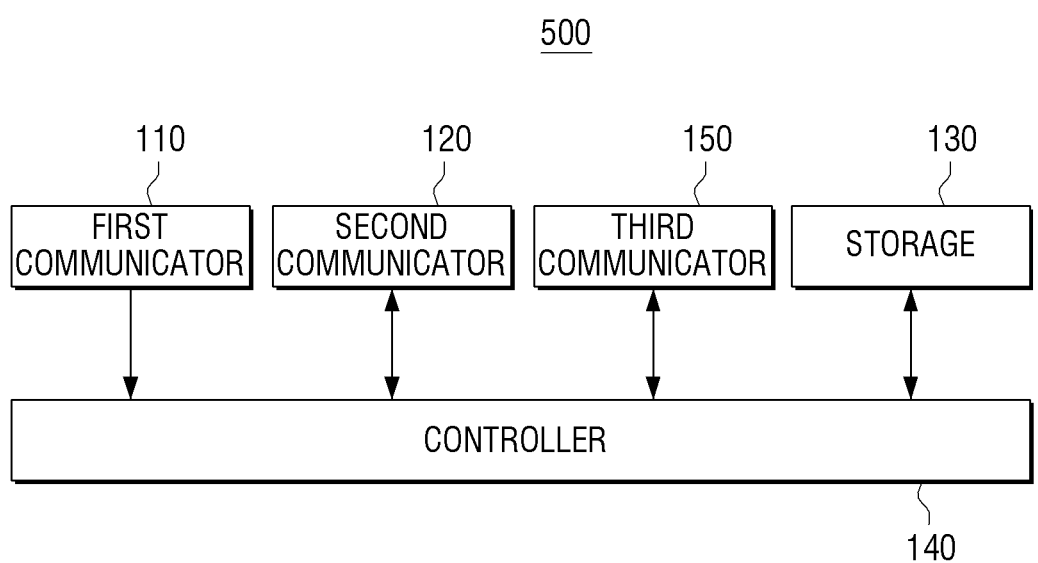
FIG. 5 is a block diagram illustrating a user terminal apparatus according to another exemplary embodiment.

FIG. 5 is a block diagram illustrating a user terminal apparatus according to another exemplary embodiment.

Referring to FIG. 5, a user terminal apparatus 500 includes a first communicator 110, second communicator 120, third communicator 150, storage 130 and controller 140. Herein, the first communicator 110, second communicator 120, storage 130 and controller 140 were already explained, and thus, additional description is omitted for brevity.

The third communicator 150 may perform bilateral wireless communication with an access point. In this example, the third communicator 150 may be different from the second communicator in that the third communicator 150 may perform bilateral wireless communication with an access point while the second communicator performs bilateral wireless communication with an external apparatus.

For example, the third communicator 150 may perform bilateral wireless communication with the access point and access a network or web, while the second communicator may perform bilateral wireless communication directly with an external apparatus without going through the access point. The bilateral wireless communication that may be performed directly with the external apparatus without going through the access point may be, for example, Bluetooth, Wi-Fi Direct, and the like.

When the user terminal apparatus 100 transmits a control signal to the electronic apparatus 200, the user terminal apparatus 100 may perform pairing with the electronic apparatus 200. When the pairing is completed, the user terminal apparatus 100 may perform bilateral wireless communication directly with the electronic apparatus 200 without going through the access point, for example, using the Bluetooth or Wi-Fi Direct technology.

Furthermore, when the user terminal apparatus 100 performs bilateral wireless communication directly with the electronic apparatus 200 and transmits the information about the connection with the access point, the electronic apparatus 200 becomes capable of connecting to the access point and a communication session with the access point may begin based on the received information about a connection with the access point.

Figure 6:
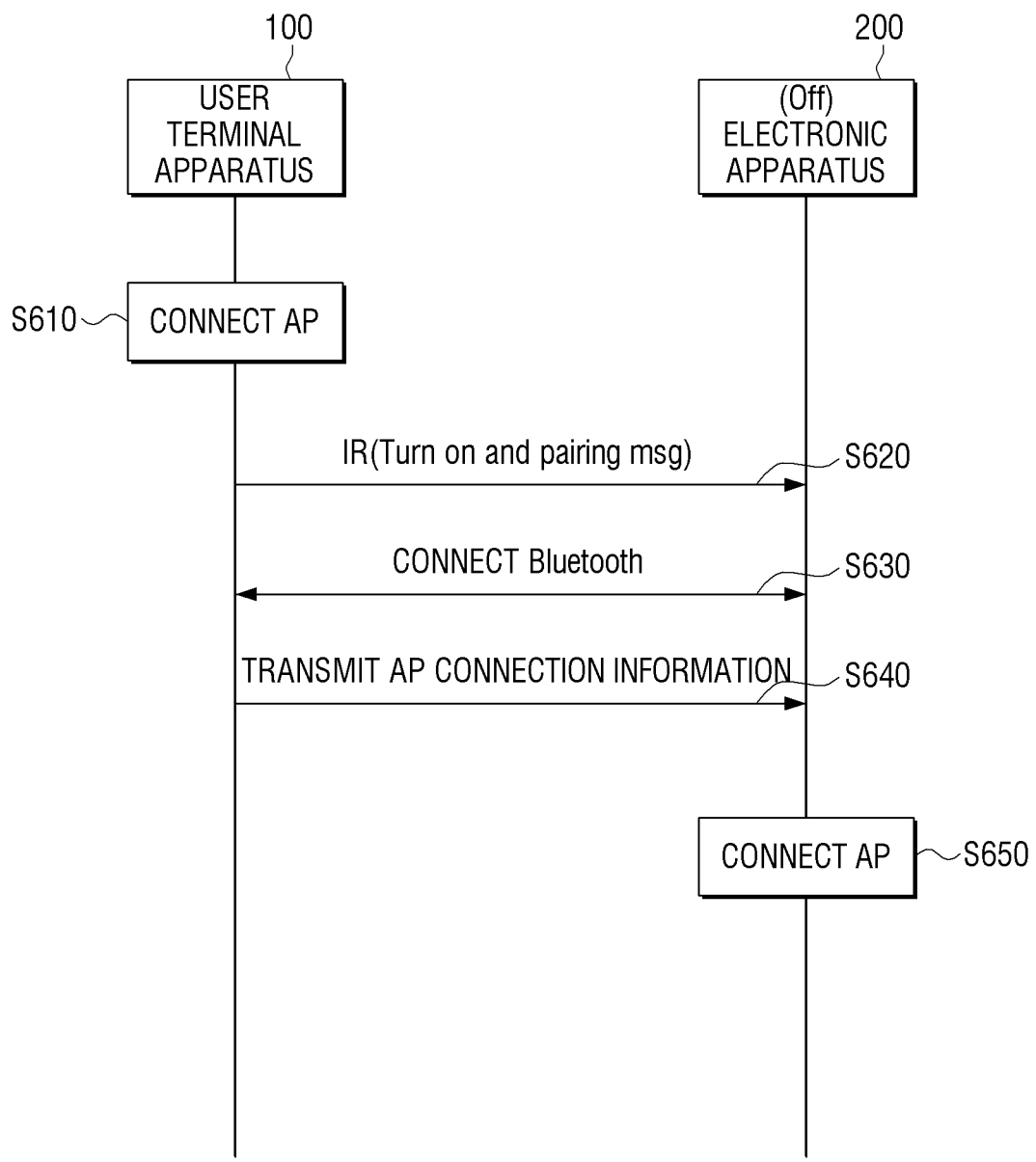
FIG. 6 is a diagram illustrating a method for connecting to an access point according to an exemplary embodiment.

FIG. 6 is a diagram illustrating a method for connecting to an access point according to an exemplary embodiment.

Referring to FIG. 6, the user terminal apparatus 100 performs a communication connection with an access point 300 (S610).

In this example, the electronic apparatus 200 is turned off as illustrated in FIG. 6. Accordingly, the user terminal apparatus 100 may transmit an IR signal that includes a turn on command for turning on the electronic apparatus 200 and a pairing initiation command (S620).

The electronic apparatus 200 receives the IR signal that includes the turn on command and pairing initiation command from the user terminal apparatus 100 and turns on in response to the turn on command, and automatically performs pairing with the user terminal apparatus 100 that transmitted the IR signal. Accordingly, when the pairing is completed, the electronic apparatus 200 is connected with the user terminal apparatus 100 via a Bluetooth connection (S630).

Furthermore, the user terminal apparatus 100 may transmit, to the electronic apparatus 200, the information about a connection with the access point 300 previously connected through Bluetooth communication (S640).

The electronic apparatus 200 that received the information about the connection with the access point 300 through Bluetooth communication connects to the access point 300 and the communication session begins with the access point 300 based on the received information about the connection with the access point 300 (S650).

In FIG. 6, the user terminal apparatus 100 transmits the control signal to the electronic apparatus 200 through the IR signal, and performs pairing to perform Bluetooth communication, however, there is no limitation thereto. For example, various unilateral wireless communication methods and bilateral wireless communication methods may be applied.

In the example of FIG. 6, the user terminal apparatus 100 is connected to the access point before it transmits the control signal to the electronic apparatus 200. As another example, the user terminal apparatus 100 may instead be connected to the access point after transmitting the control signal to the electronic apparatus 200, an example of which is described with reference to FIG. 7.

Figure 7:
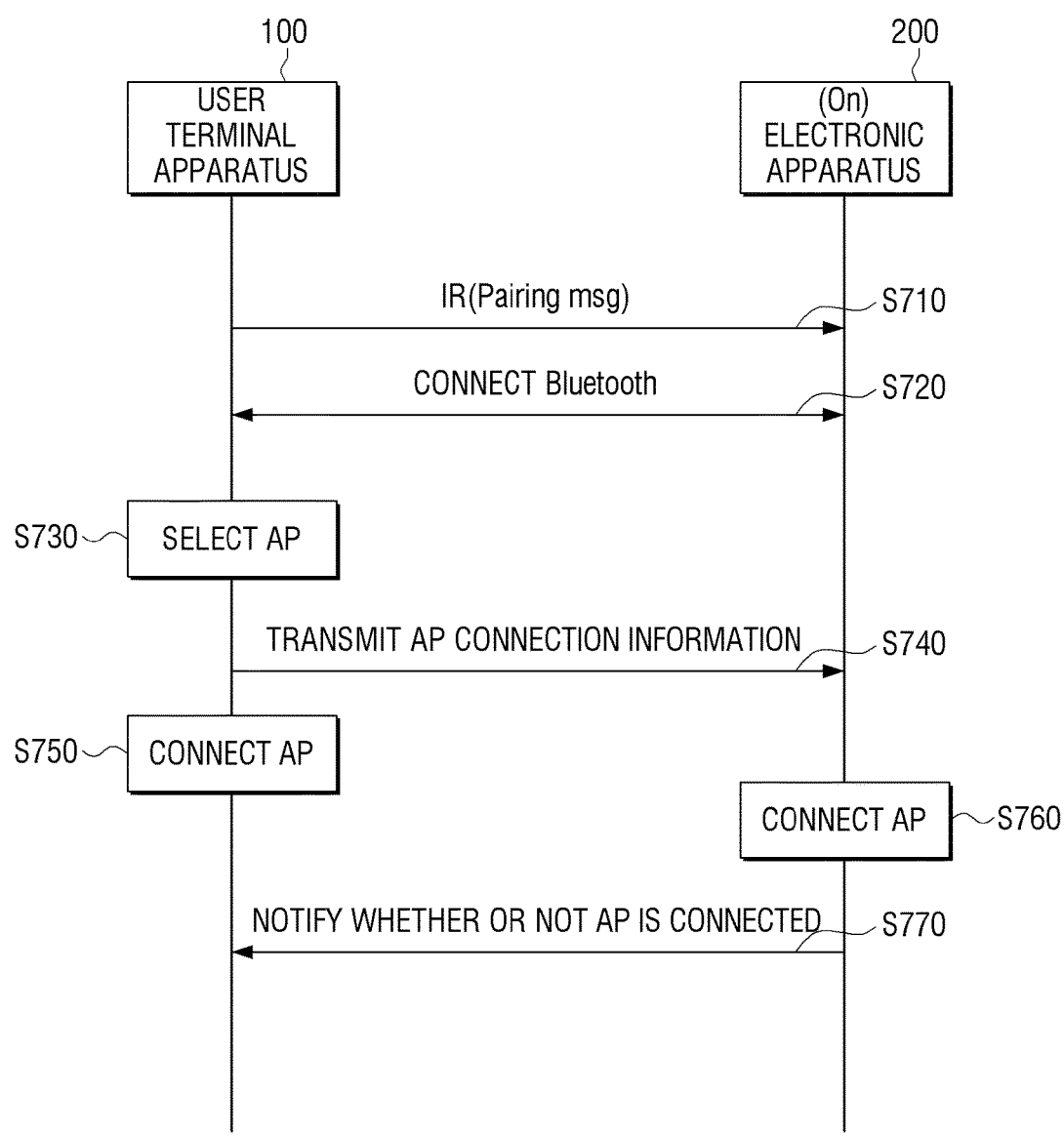
FIG. 7 is a diagram illustrating a method for connecting to an access point according to another exemplary embodiment.

FIG. 7 is a diagram illustrating a method for connecting to an access point according to another exemplary embodiment.

Referring to FIG. 7, unlike in FIG. 6, in this example the electronic apparatus 200 is already turned on. In such a case, the user terminal apparatus 100 does not transmit a control signal for turning on the electronic apparatus 200, and thus, it transmit only a control signal for a pairing operation.

In this example, the user terminal apparatus 100 transmits an IR signal that includes a pairing initiation command to the electronic apparatus 200 (S710).

Furthermore, when the electronic apparatus 200 receives the IR signal that includes the pairing initiation command from the user terminal apparatus 100, the electronic apparatus 200 performs pairing with the user terminal apparatus 100, and when the pairing is completed, the electronic apparatus 200 is connected with the user terminal apparatus 100 for Bluetooth communication (S720).

When the connection for Bluetooth communication is made, the user terminal apparatus displays a list of the information about a connection with the access point on the display 410 to enable the user to select the information about a connection with the access point (S730).

When the user selects information on a connection with one access point from the list, the user terminal apparatus 100 automatically transmits the information about the connection with the access point to the electronic apparatus 200 (S740).

In response, the user terminal apparatus 100 is connected to the selected access point (S750), and performs bilateral wireless communication, and the electronic apparatus 200 also connects to the selected access point and the communication session begins with the AP based on the received information about the connection with the access point (S760).

For example, when the electronic apparatus 200 connects to the access point, it may transmit a message that it completed the connection between the access point and the communication session to the user terminal apparatus 100 to notify whether or not the electronic apparatus 200 is connected to the AP (S770).

The user terminal apparatus 100 may receive the message indicating that the electronic apparatus 200 completed the connection with the access point and that the communication session has begun, and notify the user using an icon or sound signal.

In FIG. 7, the user terminal apparatus 100 transmits a control signal to the electronic apparatus 200 through an IR signal, and performs pairing to perform Bluetooth communication, but the exemplary embodiments are not limited thereto. For example, various unilateral wireless communication methods and bilateral wireless communication methods may be applied.

Figure 8:
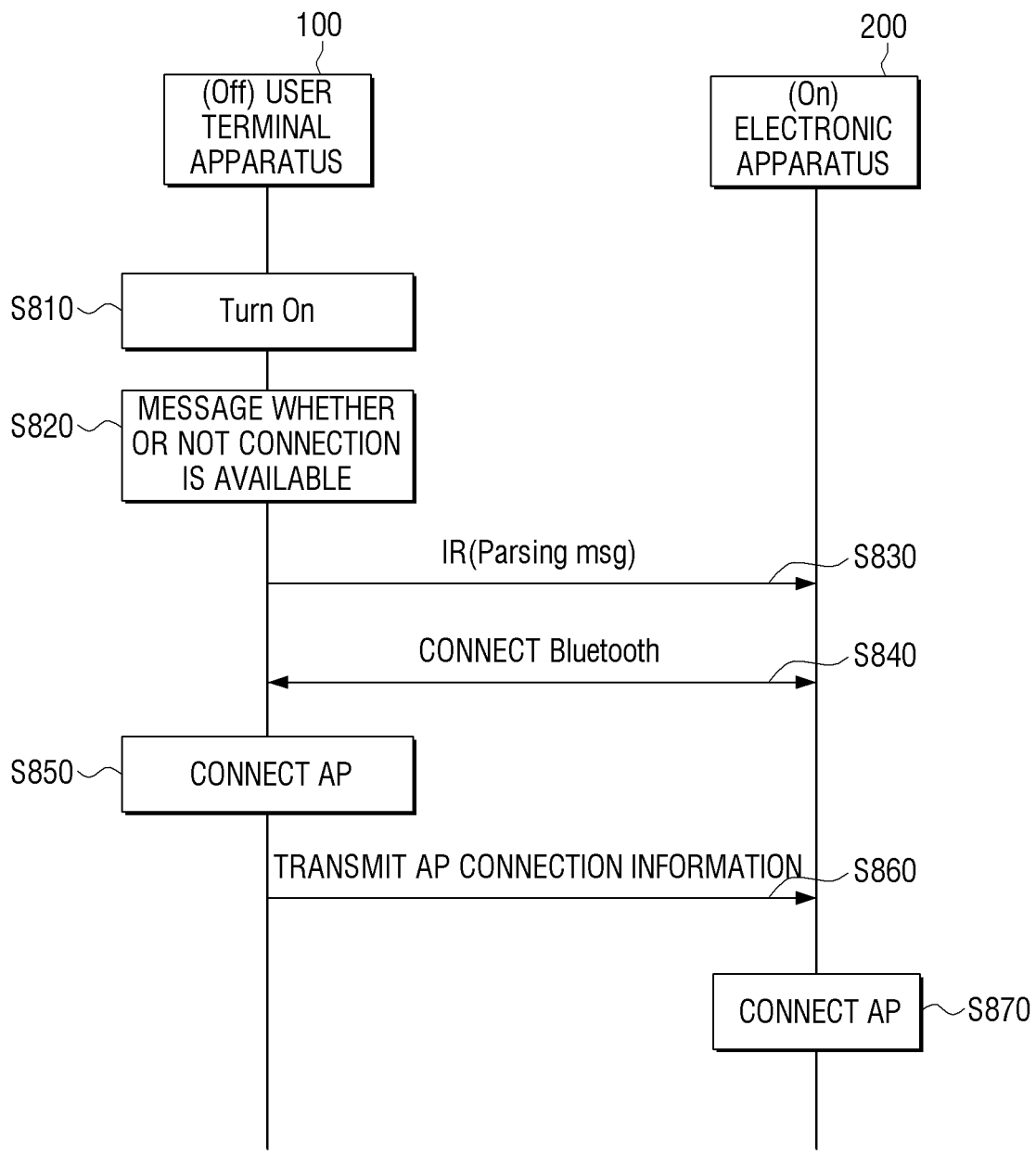
FIG. 8 is a diagram illustrating a method for connecting to an access point according to another exemplary embodiment.

FIG. 8 is a diagram illustrating a method for connecting to an access point according to another exemplary embodiment.

Referring to FIG. 8, unlike in FIGS. 6 and 7, the user terminal apparatus 100 is turned off. Also in this example, the electronic apparatus 200 is turned on.

The turned off user terminal apparatus 100 is turned on by a user manipulation (S810). After the user terminal apparatus 100 is turned on, the user terminal apparatus 100 displays a message indicating whether or not connection with a surrounding device is available (S820).

When the user inputs a user manipulation in an attempt to connect with a surrounding device, the user terminal apparatus 100 transmits an IR signal that includes a pairing initiation command to the electronic apparatus 200 (S830).

The electronic apparatus 200 receives the IR signal that includes the pairing initiation command from the user terminal apparatus 100, and automatically performs pairing with the user terminal apparatus that received the IR signal. When the pairing is completed, the electronic apparatus 200 is connected with the user terminal apparatus 100 for Bluetooth communication (S840).

After the connection for Bluetooth communication is made, the user terminal apparatus 100 is connected with the access point 300 (S850). Next, the user terminal apparatus 100 transmits information about a connection with the access point to the electronic apparatus 200 through Bluetooth communication (S860).

The electronic apparatus 200 that received the information about the connection with the access point 300 through Bluetooth communication connects the access point with the communication session based on the received information about the connection with the access point (S870).

In FIG. 8, the user terminal apparatus 100 transmits the control signal to the electronic apparatus 200 through an IR signal, and performs pairing to perform Bluetooth communication, but the exemplary embodiments are not limited thereto. For example, various unilateral wireless communication methods and bilateral wireless communication methods may be applied.

According to one or more exemplary embodiments, the first communicator 110, second communicator 120, and third communicator for performing unilateral wireless communication with the external apparatus included in the user terminal apparatus 100 may each perform communication with different communication methods.

For example, the first communicator 110 may transmit the control signal in the format of an IR signal to the external apparatus, the second communicator 120 may perform bilateral wireless communication with the external apparatus in a Bluetooth method or Wi-Fi Direct method, and the third communicator 150 may perform bilateral wireless communication with an access point in the Wifi method.

In some examples, the first communicator 110, second communicator 120 and third communicator 150 may each be physically differentiated as aforementioned. As another example, they may be implemented by a program that performs identical operations such as an IR module, Bluetooth module, Wi-Fi Direct module, and Wifi module that are included within one communicator.

The receiver 210, first communicator 220 and second communicator 230 included in the electronic apparatus 200 may each perform communication in different communication methods.

For example, the receiver 210 may receive a control signal in the format of an IR signal, from the external apparatus. The first communicator 220 may perform bilateral wireless communication with the external apparatus in the Bluetooth method or Wi-Fi Direct method. The second communicator 230 may perform bilateral wireless communication with the access point using the Wifi method.

Like the user terminal apparatus 100, the first communicator 210, second communicator 220 and third communicator 230 may each be physically differentiated as aforementioned. As another example, they may be implemented by a program that performs identical operations such as an IR module, Bluetooth module, Wi-Fi Direct module, and Wifi module, which are included within one communicator.

Meanwhile, in FIGS. 6 to 8, when the user terminal apparatus 100 is connected to an access point 300, the user terminal apparatus 100 may transmit information about the connection with the access point to an external apparatus, but the opposite is also possible.

For example, the electronic apparatus 200 may be first connected to the access point. In this example, the user terminal apparatus 100 may transmit a control signal to the electronic apparatus 200 and perform pairing with the electronic apparatus 200. When the pairing is completed, the electronic apparatus 200 may transmit information about the connection with the access point 300 to the user terminal apparatus 100.

In an example in which the electronic apparatus 200 is first connected with the access point 300, the user terminal apparatus 100 may transmit the control signal to the electronic apparatus 200 and perform pairing with the electronic apparatus 200. In this example, when the user terminal apparatus 100 requests information about the access point 300, the electronic apparatus 200 may transmit information about the access point 300 to the user terminal apparatus 100.

That is, when pairing between the user terminal apparatus 100 and electronic apparatus 200 is completed, either of the user terminal apparatus 100 and electronic apparatus 200 may transmit information about the connection with the access point 300 connected to the corresponding apparatus to the counterpart apparatus.

Figure 9:
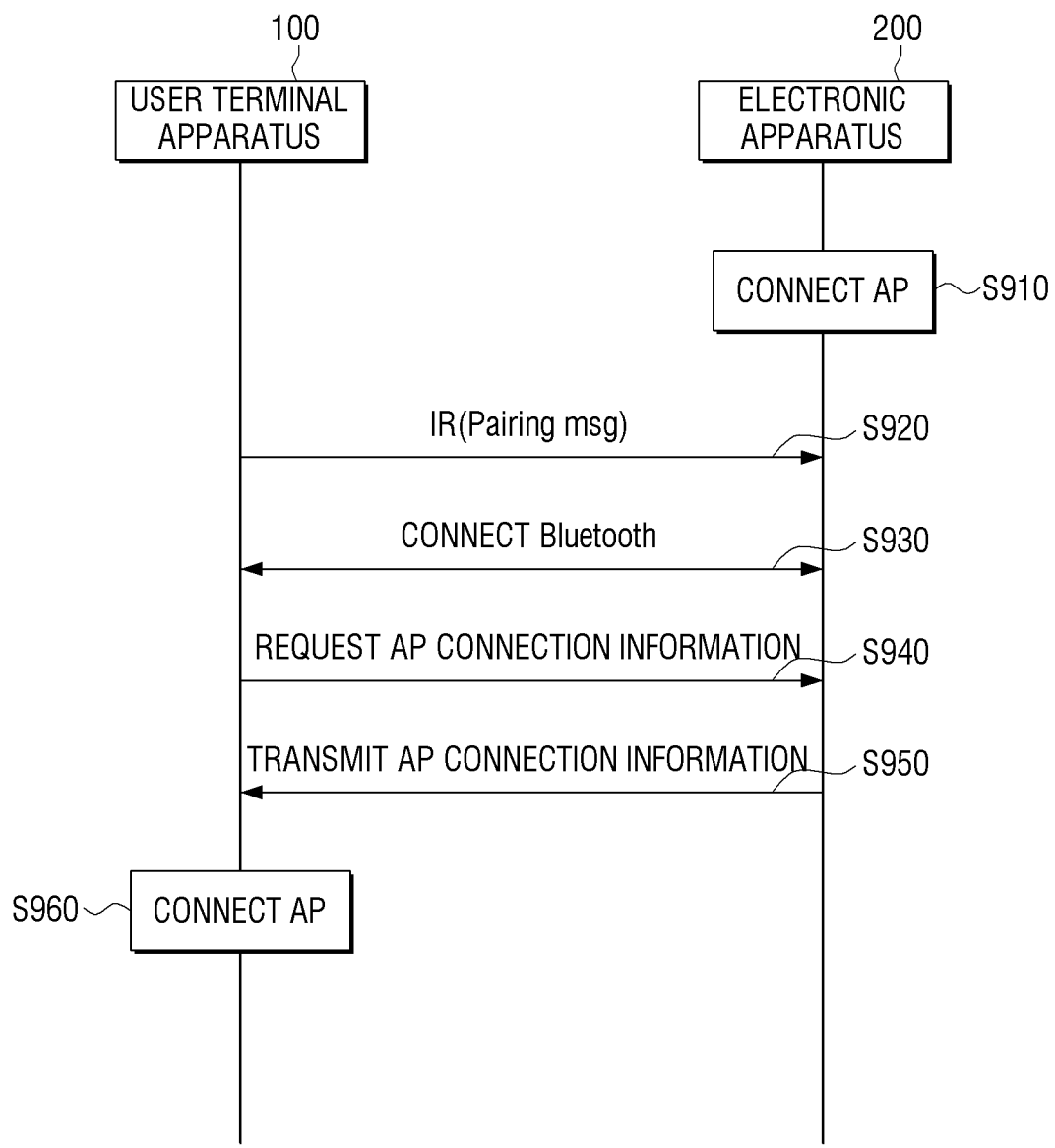
FIG. 9 is a diagram illustrating a method for connecting to an access point according to another exemplary embodiment.

FIG. 9 is a diagram illustrating an example of a method for connecting to an access point according to another exemplary embodiment.

Referring to FIG. 9, unlike the examples in FIGS. 6 to 9, the electronic apparatus 200 is connected to the access point 300.

In this example, the electronic apparatus 200 is connected to the access point (S910), and the electronic apparatus 200 is already turned on. Here, the user terminal apparatus 100 transmits an IR signal that includes a pairing initiation command (S920).

The electronic apparatus 200 receives the IR signal that includes the pairing initiation command, performs pairing with the user terminal apparatus 100, and as a result of the pairing operation a connection is established with the user terminal apparatus for Bluetooth communication (S930).

Furthermore, the user terminal apparatus 100 may request information about a connection with the access point 300 from the electronic apparatus 200 through Bluetooth communication (S940). In response thereto, the electronic apparatus 200 may transmit information about the connection with the access point to the user terminal apparatus 100 through Bluetooth communication (S950).

Accordingly, the user terminal apparatus 100 that receives the information about a connection with the access point 300 through Bluetooth communication connects to the access point 300 and a communication session begins based on the received information about the connection with the access point 300 (S960).

Referring again to the example of FIG. 6, when the user terminal apparatus 100 turns on the electronic apparatus 200, it also performs pairing with the electronic apparatus 200, and transmits information about a connection with the access point 300 to the electronic apparatus 200. In some examples, the user terminal apparatus 100 may transmit the information about a connection with the access point 300 each time it turns on the electronic apparatus 200.

In this example, when the pairing is completed, the controller 140 of the user terminal apparatus 100 may receive information about a state of connection with the access point from the external apparatus, and determine whether or not to transmit the information about the connection with the access point based on the received information about the state of connection with the access point.

According to one or more exemplary embodiments, the information about the state of connection with the access point may include information about whether or not an access point is currently connected, information about which access point it is connected with, information about the access point, and the like.

For example, when the pairing is completed, the controller 140 may receive information indicating whether or not an access point is currently connected from the external apparatus and may determine whether or not the external apparatus is currently connected with the access point.

If the external apparatus is currently connected with an access point, the controller 140 may determine not transmit information about a connection with the access point to the external apparatus. That is, only if the external apparatus is currently not connected with the access point may the controller 140 transmit the information on the access point to the external apparatus. An example of this is described with reference to FIG. 10.

Figure 10:
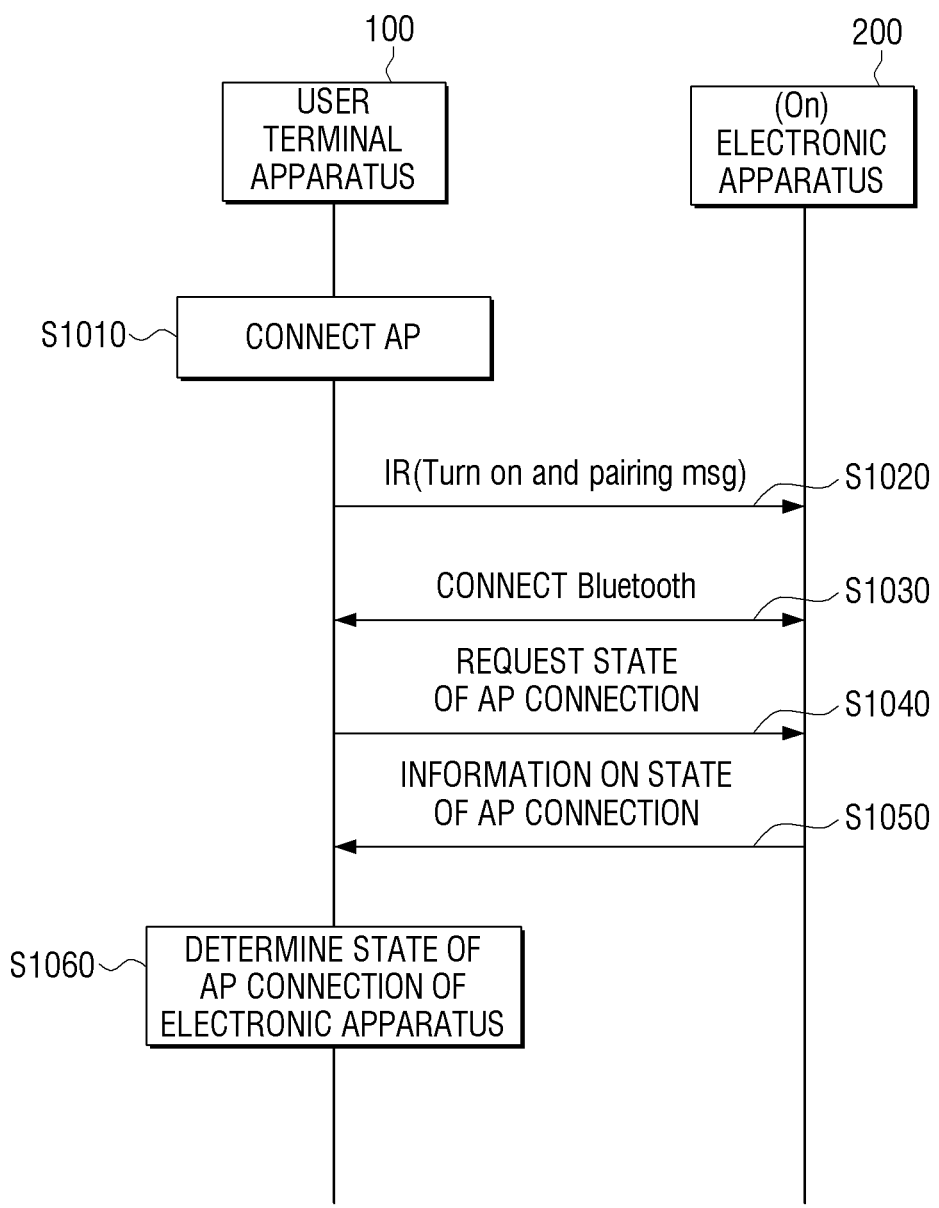
FIG. 10 is a diagram illustrating a method for connecting to an access point according to another exemplary embodiment.

FIG. 10 is a diagram illustrating a method for connecting to an access point according to another exemplary embodiment.

Referring to FIG. 10, the user terminal apparatus 100 is connected with and performs communication with an access point 300 (S1010).

Furthermore, in this example the electronic apparatus 200 is turned off. Accordingly, the user terminal apparatus 100 transmits an IR signal that includes a turn on command for turning on the electronic apparatus, and a pairing initiation command (S1020).

The electronic apparatus 200 receives the IR signal that includes the turn on command and the pairing initiation command from the user terminal apparatus 100 and is turned on. Accordingly, the electronic apparatus 200 automatically performs pairing with the user terminal apparatus 100 that transmitted the IR signal, and when the pairing is completed, the electronic apparatus 200 is connected with the user terminal apparatus 100 and may perform Bluetooth communication (S1030).

Next, the user terminal apparatus 100 requests the electronic apparatus 200 for a state of connection with the access point through the established Bluetooth communication (S1040). In response thereto, the electronic apparatus 200 transmits information about the state of the connection with the access point to the user terminal apparatus 100 through the established Bluetooth communication (S1050).

Accordingly, the user terminal apparatus 100 may determine the state of connection of the electronic apparatus 200 with the access point based on the state of connection received from the electronic apparatus (S1060).

Furthermore, if it is determined that the electronic apparatus 200 is currently connected with the access point 300 to which the user terminal apparatus 100 is connected, the user terminal apparatus 100 may not transmit the information about the connection with the access point 300 to the electronic apparatus 200. That is, the user terminal apparatus 100 may transmit the information about the connection with the access point 300 only when the electronic apparatus 200 is not currently connected with the access point 300.

Meanwhile, referring to FIG. 10, it is possible that the electronic apparatus 200 is connected to an access point other than the access point 300 to which the user terminal apparatus 100 is connected. In such a case, the information about a connection with the access point 300 stored in the user terminal apparatus may be different from the information about connection with the access point stored in the electronic apparatus 200.

Furthermore, it is possible that the user terminal apparatus 100 and electronic apparatus 200 are connected to the same access point 300 at first, and then the electronic apparatus 200 is subsequently connected to another access point, thereby changing the information about the connection with the access point. In this case, the information about the connection with the access point stored in the user terminal apparatus 100 and the information about the connection with the access point stored in the electronic apparatus 200 may differ from each other.

Accordingly, the information about a state of connection with an access point may include information about which access point an apparatus is connected to. In FIG. 10, the user terminal apparatus 100 requests the electronic apparatus 200 for a state of connection with the access point (S1040). Accordingly, when the user terminal apparatus 100 receives the information about the state of connection with the access point from the electronic apparatus 200 (S1050), the user terminal apparatus 100 may compare the information about the connection with the access point 300 to which the user terminal apparatus 100 is connected with the information about the connection with the access point to which the electronic apparatus 200 is connected, based on the information about which access point 300 is connected that is included in the received information on the state of connection with the access point.

Accordingly, in determining the state of connection with the access point of the electronic apparatus 200 (S1060), the user terminal apparatus 100 does not have to transmit the information about the connection with the access point 300 to the electronic apparatus 200 if the information about the connection with the access point 300 to which the user terminal apparatus 100 is connected is the same as the information about connection with the access point to which the electronic apparatus 200 is connected. Alternatively, if the information about the connection with the access point 300 to which the user terminal apparatus 100 is connected is different from the information about the connection with the access point to which the electronic apparatus 200 is connected, the user terminal apparatus 100 may update the information about the connection with the access point to that of the information about the connection with the access point 300 to which the user terminal apparatus 100 is connected by transmitting the information about the connection with the access point to which the user terminal apparatus 100 is connected, to the electronic apparatus 200.

It should be appreciated that the aforementioned examples may all be applied in the same manner as when the electronic apparatus 200 performs pairing with the user terminal apparatus 100 while it is connected to the access point 300, and transmits information about the connection with the access point 300 to the user terminal apparatus 100.

It should also be appreciated that the aforementioned examples may also be applied when the user visits a friend's house and performs pairing between the user's terminal apparatus and another electronic apparatus in the friend's house and connects the user's terminal apparatus to an access point in the friend's house.

Figure 11:
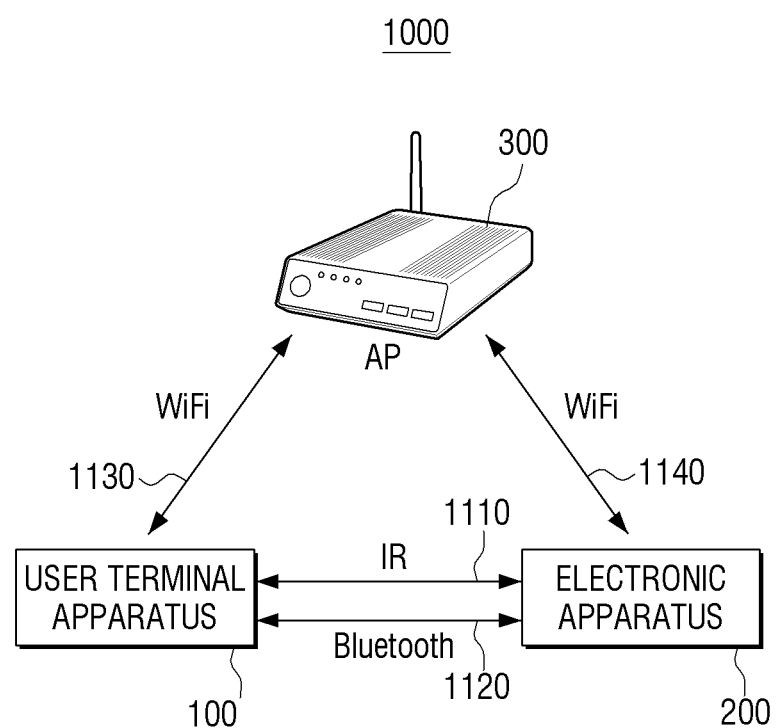
FIG. 11 is a diagram illustrating a system including a user terminal apparatus and electronic apparatus according to an exemplary embodiment.

FIG. 11 is a diagram illustrating a system that includes a user terminal apparatus and an electronic apparatus according to an exemplary embodiment.

Referring to FIG. 11, system 1000 includes an electronic apparatus 200 and a user terminal apparatus 100 for controlling an operation of the electronic apparatus 200. The user terminal apparatus 100 transmits a unilateral control signal to the electronic apparatus 200. For example, the unilateral control signal being transmitted is illustrated as an IR signal being transmitted (1110).

When the unilateral control signal is received, the electronic apparatus 200 performs pairing with the user terminal apparatus 100. During the pairing being performed, the user terminal apparatus 100 performs bilateral wireless communication with the electronic apparatus 200 and transmits information about a connection with the access point 300 to which the user terminal apparatus 100 is connected. For example, pairing may be performed between the user terminal apparatus 100 and electronic apparatus 200, and thus, the apparatuses may be connected for Bluetooth communication (1120). Accordingly, the user terminal apparatus 100 may transmit information about the access point 300 through Bluetooth communication 1120 with the access point 300 and the user terminal apparatus 100 that are connected through the Wifi method in 1130.

When the information about the connection is received, the electronic apparatus 200 performs bilateral wireless communication with the access point 300 using the information about the connection. In this example, the electronic apparatus 200 connects to the access point 300 and the communication session begins through the Wifi method 940 based on the received information about the connection.

Figure 12:
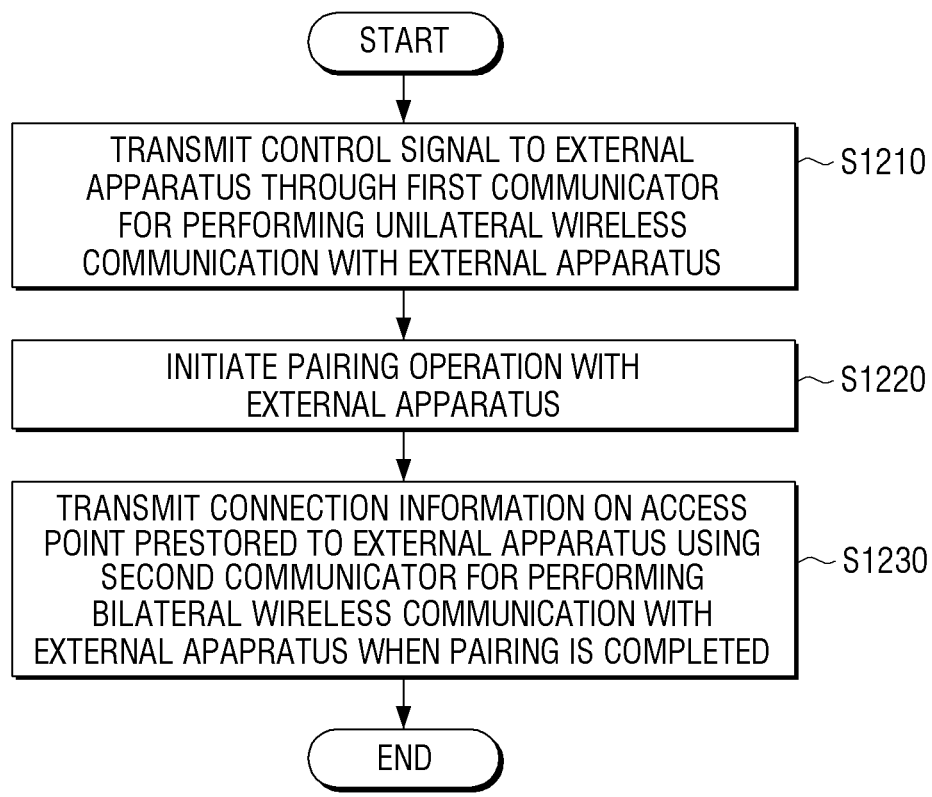
FIG. 12 is a flowchart illustrating a method for controlling a user terminal apparatus that includes a first communicator for performing unilateral wireless communication with an external apparatus and a second communicator for performing bilateral wireless communication with the external apparatus, according to an exemplary embodiment.

FIG. 12 is a flowchart illustrating a method for controlling a user terminal apparatus that includes a first communicator for performing unilateral wireless communication with an external apparatus and a second communicator for performing bilateral wireless communication with the external apparatus, according to an exemplary embodiment.

Referring to the example illustrated in FIG. 12, a control signal is transmitted to an external apparatus through a first communicator (S1210). In this example, the control signal includes a turn on command for turning on the external apparatus.

Next, a pairing operation with the external apparatus is initiated (S1220). When the pairing operation is completed, prestored information about the connection with an access point is transmitted to the external apparatus using a second communicator (S1230).

According to one or more exemplary embodiments, a method for controlling a user terminal apparatus may further include displaying a list of information about a connection with an access point that is prestored, and transmitting information about the connection selected from the list to the external apparatus through a second communicator.

Furthermore, a method for controlling a user terminal apparatus according to an exemplary embodiment includes performing bilateral wireless communication with an access point.

In the example of FIG. 12, the transmitting of the control signal (S1210) may include transmitting a control signal in the form of an IR signal to the external apparatus. Also, the transmitting of information about a connection (S1230) may include performing bilateral wireless communication with the external apparatus according to a Bluetooth or Wi-Fi Direct method, and the performing bilateral wireless communication with the access point may include performing bilateral wireless communication with the access point in the Wi-Fi method.

In some examples, a method for controlling a user terminal apparatus may further include, in response to the pairing being completed, receiving information about a connection with an access point from the external apparatus in response to the pairing being completed. The method may also include determining whether or not to transmit the received information about the connection to the external apparatus based on the received information about the state of connection with the access point.

Figure 13:
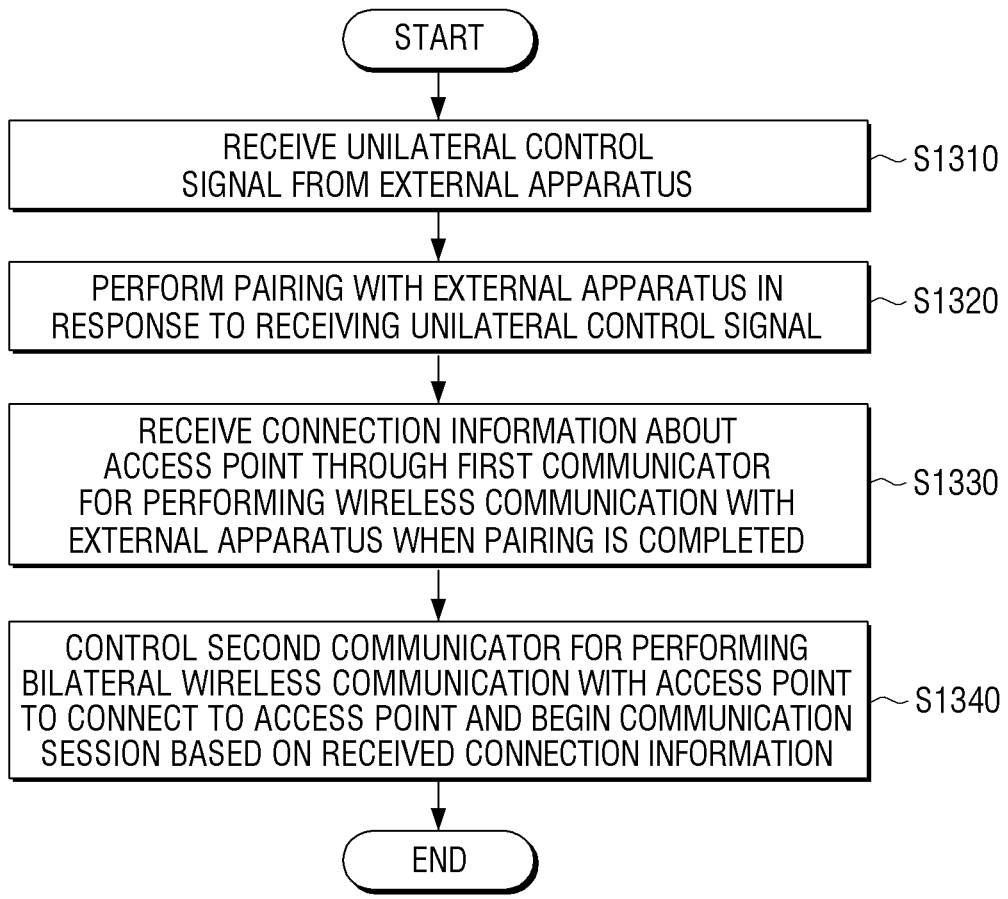
FIG. 13 is a flowchart illustrating a method for controlling an electronic apparatus that includes a first communicator for performing bilateral wireless communication with an external apparatus and a second communicator for performing a bilateral wireless communication with an access point according to an exemplary embodiment.

FIG. 13 is a flowchart illustrating a method for controlling an electronic apparatus that includes a first communicator for performing bilateral wireless communication with an external apparatus and a second communicator for performing bilateral wireless communication with an access point, according to an exemplary embodiment.

Referring to the method illustrated in FIG. 13, a unilateral control signal is received from the external apparatus (S1310).

In response to receiving the unilateral control signal, pairing with the external apparatus is performed (S1320).

In response to the pairing being completed, information about the connection with the access point is received from the first communicator (S1330).

Furthermore, the second communicator is controlled so that it connects the access point and a communication session based on the received information about the connection (S1340).

Herein, the control signal may include a turn on command for turning on the external apparatus. The receiving of the control signal (S1310) may receive the control signal in a form of an IR signal from the external apparatus, and the receiving of the information about the connection (S1330) may include performing bilateral wireless communication with the external apparatus using the Bluetooth or Wi-Fi Direct method, and the controlling the second communicator (S1340) may include performing bilateral wireless communication with the access point using the Wi-Fi method.

According to one or more exemplary embodiments, an electronic apparatus may receive information about a connection with one or more access points from a user terminal apparatus, and may easily connect to the access point based on the received information about the connection with the access point. For example, even when a short distance wireless communication reader, inputter, or display are not provided in the electronic apparatus, the electronic apparatus is capable or may become capable of easily performing connection with the access point.

There may also be provided a non-transitory computer readable medium for storing a program for successively performing a control method according to the present disclosure.

For example, there may be provided a non-transitory computer readable medium that is configured to initiate a pairing operation with the external apparatus, and, in response to the pairing being completed, transmit prestored information about a connection with an access point to the external apparatus using the second communicator.

As another example, there may be provided a non-transitory computer readable medium that is configured to perform pairing with the external apparatus in response to receiving a unilateral control signal, and, in response to the pairing being completed, receiving information about a connection with the access point through the first communicator, and controlling the second communicator to connect the access point and a communication session based on the received information about the connection.

According to one or more exemplary embodiments, while some of the examples herein illustrate apparatuses with a plurality of components, one or more of the components may be omitted, or one or more of the components may be combined. As a non-limiting example, while FIGS. 2, 3, and 5 illustrate various apparatuses with multiple communicators, one or more of the communicators may be combined into a single communicator capable of performing both functions.

A non-transitory computer readable medium refers to a computer readable medium capable of storing data permanently or semi-permanently and not for short periods of time such as a register, cache, and memory and so forth. For example, the aforementioned various applications and programs may be stored in and provided through a non-transitory computer readable medium such as a CD, DVD, hard disc, blue ray disc, USB, memory card, ROM, and the like.

Furthermore, in the aforementioned block diagrams illustrating a user terminal apparatus and electronic apparatus, buses are not illustrated, but communication between components of the user terminal apparatus and electronic apparatus may be made through one or more buses. Furthermore, each device may further include a processor such as a CPU and microprocessor configured to perform the various aforementioned steps.

Although exemplary embodiments of the present disclosure have been shown and described, it will be appreciated by those skilled in the art that changes may be made in one or more embodiments without departing from the principles and spirit of the invention, the scope of which is defined in the claims and their equivalents.

What is claimed is:

1. A user terminal apparatus comprising:
    a first communicator configured to perform unilateral wireless communication with an external apparatus;
    a second communicator configured to perform bilateral wireless communication with the external apparatus;
    a storage configured to store information about a connection with an access point; and
    a controller configured to:
        control the first communicator to transmit a control signal to the external apparatus via the unilateral wireless communication,
        initiate a pairing operation with the external apparatus based on the control signal, and
        based on the pairing operation being completed, control the second communicator to transmit the information about the connection with the access point to the external apparatus,
        wherein the control signal based on the external apparatus being in a turned-off state, turns on the external apparatus and automatically initiates the pairing operation, and based on the external apparatus being in a turned-on state, initiates the pairing operation.

2. The user terminal apparatus according to claim 1, wherein the control signal comprises the turn on command for turning on the external apparatus.

3. The user terminal apparatus according to claim 1, further comprising a display configured to display a list of the information about the connection with the access point stored in the storage,
    wherein the controller is configured to transmit information about a connection selected from the list to the external apparatus through the second communicator.

4. The user terminal apparatus according to claim 1, further comprising a third communicator configured to perform bilateral wireless communication with the access point.

5. The user terminal apparatus according to claim 4, wherein the first communicator is configured to transmit the control signal in a form of an infrared (IR) signal to the external apparatus,
    the second communicator is configured to perform the bilateral wireless communication with the external apparatus using a Bluetooth method or a Wi-Fi Direct method; and
    the third communicator is configured to perform the bilateral wireless communication with the access point using the Wi-Fi Direct method.

6. The user terminal apparatus according to claim 1, wherein the controller is configured to, based on the pairing operation being completed, receive information about a state of connection with the access point from the external apparatus, and determine whether to transmit the information about the connection with the access point to the external apparatus based on the received information about the state of connection with the access point.

7. The user terminal apparatus according to claim 1, wherein the user terminal apparatus connects with the access point before the second communicator transmits the information about the connection with the access point to the external apparatus.

8. The user terminal apparatus according to claim 1, wherein the user terminal apparatus connects with the access point after the second communicator transmits the information about the connection with the access point to the external apparatus.

9. The user terminal apparatus according to claim 1, wherein the user terminal apparatus receives a message indicating that the external apparatus completed the connection with the access point, and generates a notification message to notify about the completion of the connection between the external apparatus and the access point.

10. An electronic apparatus comprising:
a receiver configured to receive a unilateral control signal from an external apparatus;
a first communicator configured to perform bilateral wireless communication with the external apparatus;
a second communicator configured to perform bilateral wireless communication with an access point; and
a controller configured to, based on receiving the unilateral control signal, perform pairing operation with the external apparatus, receive information about a connection with the access point through the first communicator based on the pairing operation being completed, and control the second communicator to connect to the access point and begin a communication session based on the received information about the connection,
wherein the unilateral control signal based on the electronic apparatus being in a turned-off state, turns on the electronic apparatus and automatically initiates the pairing operation, and based on the electronic apparatus being in a turned-on state, initiates the pairing operation.

11. The electronic apparatus according to claim 10, wherein the unilateral control signal comprises the turn on command for turning on the electronic apparatus.

12. The electronic apparatus according to claim 10, wherein the receiver is configured to receive the unilateral control signal in a form of an infrared (IR) signal from the external apparatus,
the first communicator is configured to perform the bilateral wireless communication with the external apparatus in a Bluetooth method or a Wi-Fi Direct method; and
the second communicator is configured to perform the bilateral wireless communication with the access point in the Wi-Fi Direct method.

13. The electronic apparatus according to claim 10, wherein the information about the connection comprises a service set identifier (SSD)) and key information for connecting to the access point.

14. A system comprising:
an electronic apparatus; and
a user terminal apparatus configured to control an operation of the electronic apparatus,
wherein the user terminal apparatus is configured to transmit a unilateral control signal to the electronic apparatus,
the electronic apparatus is configured to, based on receiving the unilateral control signal, perform pairing operation with the user terminal apparatus,
the user terminal apparatus is configured to, based on the pairing operation being performed, perform bilateral wireless communication with the electronic apparatus and transmit information about a connection with an access point to which the user terminal apparatus is connected, and
the electronic apparatus is configured to, based on receiving the information about the connection, perform bilateral wireless communication with the access point using the information about the connection,
wherein the unilateral control signal based on the electronic apparatus being in a turned-off state, turns on the electronic apparatus and automatically initiates the pairing operation, and based on the electronic apparatus being in a turned-on state, initiates the pairing operation.

15. A method for controlling a user terminal apparatus that comprises a first communicator configured to perform unilateral wireless communication with an external apparatus and a second communicator configured to perform bilateral wireless communication with the external apparatus, the method comprising:
transmitting a control signal to the external apparatus via the unilateral wireless communication through the first communicator;
performing a pairing operation with the external apparatus based on the control signal; and
based on the pairing operation being completed, transmitting prestored information about a connection with an access point to the external apparatus using the second communicator,
wherein the control signal based on the external apparatus being in a turned-off state, turns on the external apparatus and automatically initiates the pairing operation, and based on the external apparatus being in a turned-on state, initiates the pairing operation.

16. The method according to claim 15, wherein the control signal comprises the turn on command for turning on the external apparatus.

17. The method according to claim 15, further comprising displaying a list of the prestored information about the connection with the access point,
wherein the transmitting the information about the connection comprises transmitting information about a connection selected from the list, to the external apparatus, through the second communicator.

18. The method according to claim 15, further comprising performing bilateral wireless communication with the access point.

19. The method according to claim 18, wherein the transmitting the control signal comprises transmitting the control signal in a form of an infrared (IR) signal to the external apparatus,
the transmitting the information about the connection comprises performing bilateral wireless communication with the external apparatus in a Bluetooth method or a Wi-Fi Direct method, and
the performing the bilateral wireless communication with the access point comprises performing the bilateral wireless communication with the access point in the Wi-Fi Direct method.

20. The method according to claim 15, further comprising:
based on the pairing operation being completed, receiving information about a state of connection with the access point from the external apparatus; and
determining whether to transmit the information about the connection with the access point to the external apparatus based on the received information about the state of connection with the access point.

21. A method for controlling an electronic apparatus that comprises a first communicator configured to perform bilateral wireless communication with an external apparatus and a second communicator configured to perform bilateral wireless communication with an access point, the method comprising:
receiving a unilateral control signal from the external apparatus;
based on receiving the unilateral control signal, performing pairing operation with the external apparatus;

based on the pairing operation being completed, receiving information about a connection with the access point through the first communicator; and controlling the second communicator to connect to the access point and begin a communication session based on the received information about the connection, wherein the unilateral control signal based on the electronic apparatus being in a turned-off state, turns on the electronic apparatus and automatically initiates the pairing operation, and based on the electronic apparatus being in a turned-on state, initiates the pairing operation.

22. The method according to claim 21, wherein the unilateral control signal comprises the turn on command for turning on the electronic apparatus.

23. The method according to claim 21, wherein the receiving the unilateral control signal comprises receiving the unilateral control signal in a form of an infrared (IR) signal from the external apparatus, the receiving the information about the connection comprises performing bilateral wireless communication with the external apparatus in a Bluetooth method or a Wi-Fi Direct method, and the controlling the second communicator comprises performing bilateral wireless communication with the access point in the Wi-Fi Direct method.

* * * * *